(12) United States Patent
Marlowe

(10) Patent No.: US 11,610,072 B2
(45) Date of Patent: *Mar. 21, 2023

(54) SOFTWARE SYSTEMS FOR FACILITATING OBJECT TRANSPORT

(71) Applicant: Acuitive Solutions, Inc., Charlotte, NC (US)

(72) Inventor: Phillip Marlowe, Weddington, NC (US)

(73) Assignee: Acuitive Solutions, Inc., Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/864,981

(22) Filed: Jul. 14, 2022

(65) Prior Publication Data

US 2022/0350981 A1 Nov. 3, 2022

Related U.S. Application Data

(63) Continuation of application No. 17/348,489, filed on Jun. 15, 2021, now Pat. No. 11,423,245.

(Continued)

(51) Int. Cl.
*G06K 7/14* (2006.01)
*G06K 15/02* (2006.01)
*H04L 67/01* (2022.01)

(52) U.S. Cl.
CPC ......... *G06K 7/1413* (2013.01); *G06K 15/024* (2013.01); *H04L 67/01* (2022.05)

(58) Field of Classification Search
CPC .............. G06K 7/1413; G06K 15/024; G06K 7/10861; G06K 7/1417; G06Q 10/08; G06Q 10/083

(Continued)

(56) References Cited

U.S. PATENT DOCUMENTS

2006/0136237 A1 6/2006 Spiegel et al.
2008/0128496 A1* 6/2008 Bertranou .............. G06Q 10/08
235/383

(Continued)

FOREIGN PATENT DOCUMENTS

CA 2893502 C * 1/2018 ............... B07C 3/00

OTHER PUBLICATIONS

U.S. Appl. No. 17/348,489, "Non-Final Office Action", dated Jan. 31, 2022, 10 pages.
(Continued)

*Primary Examiner* — Edwyn Labaze
(74) *Attorney, Agent, or Firm* — Kilpatrick Townsend & Stockton LLP

(57) ABSTRACT

One example of the present disclosure can include a server that can determine transport routes for individual objects based on rules. The transport routes can include an intermediary at which the individual objects are to be consolidated into a single container. The server can also receiving a request from a client computer for an object label corresponding to one of the individual objects. In response to receiving the request, the server can determine the intermediary based on a transport route for the object, generate the object label based on the intermediary, and transmit the object label to the client computer for causing the object label to be printed with a printer and coupled to the object.

22 Claims, 12 Drawing Sheets

Related U.S. Application Data

(60) Provisional application No. 63/049,795, filed on Jul. 9, 2020.

(58) Field of Classification Search
USPC .......................... 235/462.01, 376, 375, 384
See application file for complete search history.

(56) References Cited

U.S. PATENT DOCUMENTS

| | | |
|---|---|---|
| 2012/0241516 A1 | 9/2012 | Zuleeg |
| 2016/0019497 A1 | 1/2016 | Carvajal |
| 2016/0217399 A1 | 7/2016 | Roelofs et al. |
| 2017/0116564 A1 | 4/2017 | Luo |
| 2018/0232693 A1 | 8/2018 | Gillen et al. |
| 2020/0051015 A1* | 2/2020 | Davis ................. G06K 19/0723 |
| 2021/0304135 A1 | 9/2021 | Rahilly et al. |
| 2022/0253791 A1* | 8/2022 | Andrews .............. G06Q 10/083 |

OTHER PUBLICATIONS

U.S. Appl. No. 17/348,489, "Non-Final Office Action", dated Oct. 12, 2021, 8 pages.

U.S. Appl. No. 17/348,489, "Notice of Allowance", dated Apr. 15, 2022, 7 pages.

* cited by examiner

| | Move Description | Origin Rule | Origin Consol Loc | Destination Rule | Destination Consol Loc | Final Destination | # of Legs |
|---|---|---|---|---|---|---|---|
| 1 | Egypt to GSO Photo Studio | Direct | - | Direct | - | GSO Photo Shoot | 1 |
| 2 | Egypt to S000-0005 | Direct | - | Consol | 650 Madison | 650 Madison S000-0005 | 2 |
| 3 | Hanoi to GSO Photo Studio | Consol | Hanoi | Direct | - | GSO Photo Shoot | 2 |
| 4 | Shanghai to SA00-0002 | Consol | Shanghai | Consol | Italy / Compagine | Compagine DC SA00-0002 | 3 |
| 5 | Shanghai to SA00-0003 | Consol | Shanghai | Consol | Italy / Compagine | Showroom France SA00-0003 | 3 |

FIG. 3

SOFTWARE SYSTEMS FOR FACILITATING OBJECT TRANSPORT

CROSS-REFERENCE TO RELATED APPLICATION

This application is a continuation of U.S. patent application Ser. No. 17/348,489, titled "SOFTWARE SYSTEMS FOR FACILITATING OBJECT TRANSPORT," filed Jun. 15, 2021, which claims priority to U.S. Provisional Patent Application No. 63/049,795, titled "SOFTWARE SYSTEMS FOR FACILITATING OBJECT TRANSPORT," filed Jul. 9, 2020, the entirety of each of which is hereby incorporated by reference.

TECHNICAL FIELD

The present disclosure generally relates to software systems for facilitating transport of objects. More specifically, but not by way of limitation, this disclosure relates to software systems configured to help optimize the transport of multiple objects.

BACKGROUND

Various technologies such as barcodes, barcode scanners, monitoring systems, database systems, label printing systems, automatic sorters, and robotic devices such as autonomous vehicles, have become increasingly important in facilitating the transport of objects. For example, it is now commonplace for an object to be labeled with a barcode that is scanned with a scanning device at various locations along the object's route in order to update centralized databases as to the object's status and location. Corresponding software can provide an Internet-based, centralized interface through which various entities associated with the object can receive status updates and other data about the object. While these technologies can aid in the transport of objects by providing object monitoring and automation, they often provide little feedback to improve the transport process itself.

SUMMARY

One example of the present disclosure includes a method that can be implemented by a server. The method can include providing a website to a first client computer and a second client computer via a network; receiving rules from the first client computer via the website; determining a plurality of transport routes for a plurality of individual objects based on the rules, the plurality of transport routes including an intermediary at which the plurality of individual objects are to be consolidated into a single container; and receiving a request from the second client computer via the website for an object label corresponding to an object among the plurality of individual objects. The method can also include, in response to receiving the request: determining the intermediary based on the transport route for the object from among the plurality of transport routes; generating the object label based on the intermediary, the object label including (i) a barcode encoded with data about the object and (ii) a unique identifier of the intermediary; and transmitting the object label to the second client computer via the website for causing the object label to be printed with a printer and coupled to the object.

Another example of the present disclosure includes a method that can be implemented by a server. The method can include receiving a request from a client computer for an object label corresponding to an object to be transported from a source to an end destination; determining an intermediary at which the object is to be combined with at least one other object into a single container; generating the object label in response to receiving the request, the object label including a unique identifier of the intermediary; and transmitting the object label to the client computer for causing the object label to be printed with a printer and coupled to the object.

Another example of the present disclosure can include a system with a processor and a memory. The memory can include program code that is executable by the processor for causing the processor to implement any of the methods described above.

Another example of the present disclosure can include a non-transitory computer-readable medium comprising program code that is executable by a processor for causing the processor to implement any of the methods described above.

Yet another example of the present disclosure can includes a method involving operating a client computer to request an object label for an object from a server, wherein the object is to be transported in a container from a source to an end destination; receiving the object label at the client computer from the server, the object label including a unique identifier of an intermediary at which the object is to be combined with at least one other object into a single container; operating the client computer to print the object label with a printer, thereby generating a printed object label; coupling the printed object label to the object; and depositing the object with a carrier for transport to the intermediary.

Still another example of the present disclosure can includes a method involving receiving a plurality of objects being transported in separate containers from at least one source to at least one end destination; identifying a plurality of object labels corresponding to the plurality of objects; operating a client computer to provide information from the plurality of object labels to a server; receiving a consolidation instruction from the server at the client computer, the server being configured to generated the consolidation instruction based on the information; and consolidating the plurality of objects into a single container based on the consolidation instruction from the server.

These illustrative examples are mentioned not to limit or define the limits of the present subject matter, but to aid understanding thereof. These and other illustrative examples are discussed in the Detailed Description, and further description is provided there. Advantages offered by various examples may be further understood by examining this specification and/or by practicing one or more examples of the claimed subject matter.

BRIEF DESCRIPTION OF DRAWINGS

A full and enabling disclosure is set forth more particularly in the remainder of the specification. The specification makes reference to the following appended figures.

FIG. 3 is a table of rules according to some aspects of the present disclosure.

DETAILED DESCRIPTION

Figure 1:
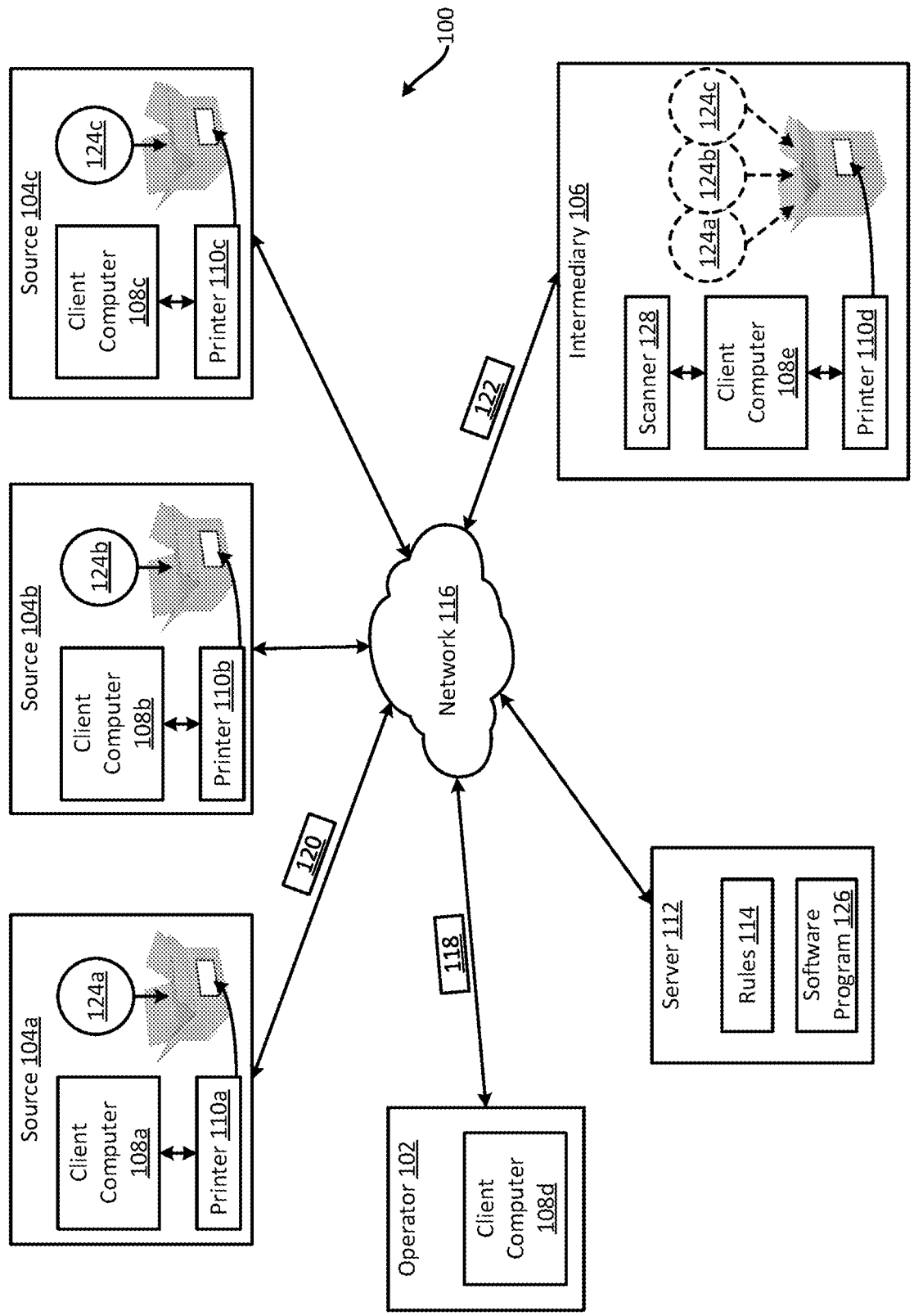
FIG. 1 is a block diagram of an example of a system according to some aspects of the present disclosure.

Various technologies can aid in the transport of objects. But existing technologies are generally limited to object monitoring and automation. They often provide little feedback to improve the transport process itself, which is often fragmented and suboptimal. For example, one common scenario involves multiple objects being individually boxed and transported from multiple sources (e.g., object manufacturers) to a single destination, even though the sources may be generally in the same geographical region, such as in the same state or province. But individually boxing each object may take up more carrier space, require more packaging elements, increase overall weight, increase fuel consumption and other transport costs, and require more personnel than alternative approaches, such as if the objects were combined into fewer boxes.

Some examples of the present disclosure can overcome one or more of the abovementioned problems by providing a system that can coordinate the transport of multiple objects to improve the efficiency thereof. The system can allow various entities to combine objects into fewer containers (e.g., boxes) for transport and optimize the transport route of various objects from their sources to their destinations, which in turn can reduce fuel consumption, reduce consumption of packaging elements, reduce personnel requirements, reduce costs, reduce the amount of space consumed by the objects on carriers, and so on.

One illustrative example of the present disclosure can involve a group of manufacturers located at location A, which may be a particular geographical region. The group of manufacturers may be contracted to produce objects and mail the objects to a common end destination, such as a warehouse at location B. In this illustrative example, the manufacturers can each operate respective client devices to interact with a centralized server executing one or more software programs ("software"), which can assist in coordinating the transport of the objects.

The server may rely on static or dynamic rules to determine how to combine and transport objects. The rules may be predefined, in that they are input to the server prior to any of the objects being mailed from the manufacturers. The rules form an optimization algorithm for determining optimal routes for the objects based on the inputs and other shipping data, such as rates associated with various service providers (e.g., mail carriers). Based on the rules, the server can determine one or more transport routes for the objects from their sources to their end destinations. For example, a user may input the types of the objects to be transported, the geographic locations of the manufacturers, restrictions or constraints on service providers, preferred service providers, dimensions of the objects or their containers, the end destinations for the objects, and any applicable deadlines (e.g., dates by which the objects must be delivered). The user may or may not be the same entity that contracted the manufacturers to produce the objects. The server can apply the rules to these inputs to determine one or more transport routes for the objects to their end destinations. The transport routes may include one or more intermediaries at which the objects are to be consolidated together and/or deconsolidated to help optimize the transport of the objects.

In the illustrative example, the server can determine that the objects are to be combined at an intermediary that is geographically proximate to the manufacturers. For example, the first intermediary may also be located in region A. The server can then generate and transmit object labels back to the client devices of the manufacturers. Each object label may designate the intermediary as a first destination to which the corresponding object is to be mailed by a manufacturer. Each object label may also designate the end destination as a second destination to which the corresponding object is to be mailed. The manufacturers can print out the object labels using printers associated with the client devices; couple the printed object labels to the objects, such as to the exterior of containers for the objects; and then mail the objects to the intermediary.

Next, the intermediary can receive the individual objects from the manufacturers. The intermediary can determine, based on the object labels, that the objects are to be combined and how they are to be combined. For example, the intermediary can determine that all of the objects are to be consolidated into a single container based on all of the objects going to the same end destination. The containers into which the objects are to be combined can be referred to herein as "consolidation containers." Based on this determination, the intermediary can combine the objects together into the consolidation container.

The intermediary can also operate the client device to request a label for the consolidation container from the server. For example, the intermediary can operate the client device to transmit a request for the label to the server, where the request indicates one or more characteristics (e.g., the weight and dimensions) of the consolidation container. The server can receive the request and generate the container label (e.g., a digital label) for the consolidation container. The server can generate the container label based on characteristics of the consolidation container and the previously determined transport route for the objects. For example, the container label can specify that the destination for the consolidation container is the end destination for the objects. The server can then transmit the container label back to the intermediary's client device. The intermediary can print out the container label using a printer associated with the client device; couple the printed container label to the consolidation container, such as to the exterior of consolidation container; and then mail the consolidation container to the next destination specified on the container label. Although in the illustrative example the next destination is the end destination for the objects, it will be appreciated that in other examples the next destination may be another intermediary along the route, where that intermediary can repeat the above processes to further reorganize the objects.

Combining the multiple objects into fewer containers at one or more intermediaries can significantly reduce the burdens associated with transporting the objects between two or more locations. For example, fewer containers can take up less physical space on a carrier than, have an overall lower weight than, and require less packaging than the aggregate of the separate containers for the individual objects. Consequently, the software described herein may yield significant improvements over typical shipping software technologies that do not provide this type of coordination and feedback.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 according to some aspects of the present disclosure. The system 100 includes an operator 102. The system 100 also includes sources 104a-c of objects, such as clothing, electronics, chemicals, and biologics. The sources 104a-c may (or may not) be associated with the operator 102. For example, the operator 102 may have contracted with, or otherwise requested that, the sources 104a-c produce the objects 124a-c.

The operator 102 and the sources 104a-c have respective client computers 108a-d (or "client devices"), such as laptop computers, desktop computers, smartphones, or tablets. Those entities can operate the client computers 108a-d to interact with a server 112 over a network 116, such as a local area network (LAN), a wide area network (WAN), or the Internet. Although only one server 112 is shown in FIG. 1 for simplicity, the server 112 may represent any number and combination of servers in any suitable arrangement, such as a group of server nodes in a cloud computing environment or a computing cluster.

In some examples, the server 112 can enable the operator 102 and the sources 104a-c to interact with one another about the transport of the objects 124a-c. For example, the server 112 can provide a web-portal (e.g., a website) that is accessible to the operator 102 and the sources 104a-c via the client computers 108a-c. Those entities may have their own accounts through which they can login to and interact with the web-portal. Upon logging in, each entity may be presented with an interface (e.g., a graphical user interface) through which the entity can interact with the server 112, to provide input to and receive output from the server 112.

The server 112 can execute a software program 126 for implementing some aspects described herein. The software program 126 can include one or more software elements executing on one or more servers 112. For example, the software program 126 can include a group of services executing in virtual machines or containers (e.g., Docker containers) on multiple nodes in a cloud computing environment or a computing cluster. In some examples, the software program 126 can include a group of microservices. Microservices are self-contained stateless services that are generally configured to perform a specific task. Microservices can interact with each other through well-defined application programming interfaces (APIs) in order to coordinate and generate responses to end-user requests. Individual microservices may be developed by different developers, with each microservice being developed, updated, and deployed independently of other microservices. Software applications formed from microservices can provide improvements to scalability, robustness, isolation, and development time.

The server 112 can determine transport routes for the objects 124a-c based on rules 114 provided as input 118 from an entity, such as the operator 102. The rules 114 can include preferences and constraints relating to the transport of the objects 124a-c. In some examples, the rules 114 can specify which objects are to be combined together (e.g., consolidated), where they are to be combined, how they are to be combined, and/or which service providers are to be used during their transport. For example, the rules 114 can indicate that the objects 124a-c are to be combined at one or more intermediaries, which may be located geographically proximate to the sources 104a-c. Additionally or alternatively, the rules 114 can specify which objects are to be separated (e.g., deconsolidated) and how they are to be separated during their transport. For example, the rules 114 can indicate that the objects 124a-c are to be deconsolidated at one or more intermediaries, which may be located geographically proximate to the one or more end destinations. Additionally or alternatively, the rules 114 can specify that certain objects cannot be combined together (e.g., certain laws or regulations may prohibit certain objects from being combined together), that certain service providers cannot be used in the transport of the objects, and/or that certain geographical regions are to be evaded during transport of the objects. In some examples, the rules 114 may be prioritized such that some rules are accorded greater weight than other rules and/or such that the rules 114 are applied in a particular sequence. The user may select the priorities and/or the ordering of the rules 114. Based on these rules 114 and their priorities, the server 112 can determine one or more transport routes for the objects 124. In this way, the server 112 can assist in combining the objects 124a-c and coordinating their transport among various entities in the transport route.

In general, the transport routes for the objects can be determined by the server 112 prior to the objects 124a-c leaving their sources 104a-c and then stored for subsequent use by the server 112. As noted above, the server 112 can determine the transport routes based on the rules 114, which can be input prior to the objects 124a-c leaving their sources 104a-c. But in some examples, the rules 114 can be dynamic or otherwise changeable during the transport of the objects 124a-c. For example, the operator 102 may update some or all of the rules 114 at any point during the transport of the objects 124a-c to modify their travel routes—e.g., the number, arrangement, and locations of the intermediaries through which the objects 124a-c will pass. This can allow for the operator 102 to exercise greater control over transport of the objects 124a-c and respond to potential problems with their transport in real time.

In the example shown in FIG. 1, the sources 104a-c can manufacture objects 124a-c and prepare the objects 124a-c for transport. In particular, the sources 104a-c can operate the client computers 108a-c to transmit requests, such as request 120, to the server 112 for object labels corresponding to the objects 124a-c. An object label can be digital data in a format (e.g., an image or PDF format) that is configured to be printed and coupled (e.g., directly or indirectly) to an object, such as to the object itself or to the exterior of a container including the object. The server 112 can receive the requests and generate the object labels based on the rules 114 and/or the previously determined transport routes for the objects. For example, the rules 114 may indicate that the objects 124a-c are to be combined at the intermediary 106.

So, the server 112 can generate the object labels to indicate the intermediary 106 as a next destination based on the rules 114. In one such example, the server 112 can generate the object labels to include a unique identifier (e.g., a numerical code or address) of the intermediary 106 as the next destination. The server 112 may also generate the object labels to include barcodes that are encoded with data about the objects 124a-c. Examples of such data may include a name, type, style, source, weight, size, dimension, unique identifier, or destination associated with the object. The server 112 can then transmit the object labels back to the client computers 108a-c of the sources 104a-c. The sources 104a-c may then print the object labels via printers 110a-c communicatively coupled to the client computers 108a-c and couple the printed object labels to the objects 124a-c. That is, the sources 104a-c can couple the printed object labels directly to the objects 124a-c or to containers including the objects 124a-c (e.g., as shown in FIG. 1). With the printed object labels coupled to the objects 124a-c, the sources 104a-c can submit the objects 124a-c to a carrier for transport to the intermediary 106. At this stage, the objects 124a-c may be transported in separate containers to the intermediary 106.

The intermediary 106 can receive the objects 124a-c in their separate containers from the carrier. The intermediary 106 may then scan the barcodes on the object labels using a barcode scanner 128 or otherwise provide the data about the objects 124a-c as input to the client computer 108e. The client computer 108e can receive the data and transmit the data to the server 112. In some examples, the server 112 can update a status or location of the objects 124a-c based on the data. Additionally or alternatively, the server 112 can generate consolidation instructions ("instructions") for the objects 124a-c based on the data. The instructions can describe how to combine multiple objects together into one or more containers. The server 112 may determine how to combine the objects 124a-c based on the rules 114, any number and combination of characteristics of the objects 124a-c, and/or any number and combination of characteristics of the containers into which the objects will be combined. For example, the server 112 can access the rules 114 to determine that the objects 124a-c are to be combined by the intermediary 106 into as few containers as possible, such as a single container. The server 112 may then execute an optimization algorithm to determine how to organize the objects 124a-c into the fewest containers based on one or more dimensions of the objects and one or more dimensions of the containers. The server 112 can then provide the instructions back to the client computer 108e of the intermediary 106, which can receive the instructions and combine the objects 124a-c into the one or more containers in accordance with the instructions.

After combining the objects 124a-c into the one or more containers, the intermediary 106 may operate the client computer 108e to transmit one or more requests, such as request 122, to the server 112 for one or more container labels. A container label can be a digital data in a format (e.g., an image or PDF format) that is configured to be printed and coupled to the exterior of a container. The server 112 can receive the requests and generate the one or more container labels based on the rules 114 and/or the previously determined transport routes for the objects 124a-c. For example, the previously determined transport routes may indicate that the objects 124a-c are to be further combined or separated at another intermediary. So, the server 112 can generate the container labels to indicate the other intermediary as a next destination based on the rules 114. For example, the server 112 can generate the container labels to include a unique identifier of the other intermediary 105b as the next destination. The server 112 may also generate the container labels to include barcodes that are encoded with data about the objects 124a-c. The server 112 can then transmit the container labels back to the client computer 108e of the intermediary 106. The intermediary 106 can receive the container labels, print them via a printer 110d that is communicatively coupled to the client computer 108e, and couple the printed container labels to the containers. With the printed container labels coupled to the containers, the intermediary 106 can submit the containers to a carrier for transport to the next destination. As a result, the objects 124a-c may be transported in fewer containers to the next destination than would otherwise be possible without the above-described process. If the next destination is another intermediary, the above process may be repeated at the other intermediary based on additional objects received by that intermediary, and so on, until the objects 124a-c reach their end destination.

It will be appreciated that the specific number and arrangement of elements in FIG. 1 are intended to be illustrative and non-limiting. Other examples may involve more, fewer, or a different arrangement of the elements shown in FIG. 1. For example, although the rules 114 are shown as internal to the server 112 in FIG. 1, in other examples the rules 114 may be located elsewhere such as in a remote database that is accessible to the server 112. And although the operator 102 is shown as being separate from the sources 104a-c and the intermediary 106, in other examples the operator 102 may also be a source 104 or an intermediary 106. Other examples can also include any number and combination of intermediaries at which any number and combination of objects from any number and combination of sources may be combined or separated according to any number of rules.

Figure 2:
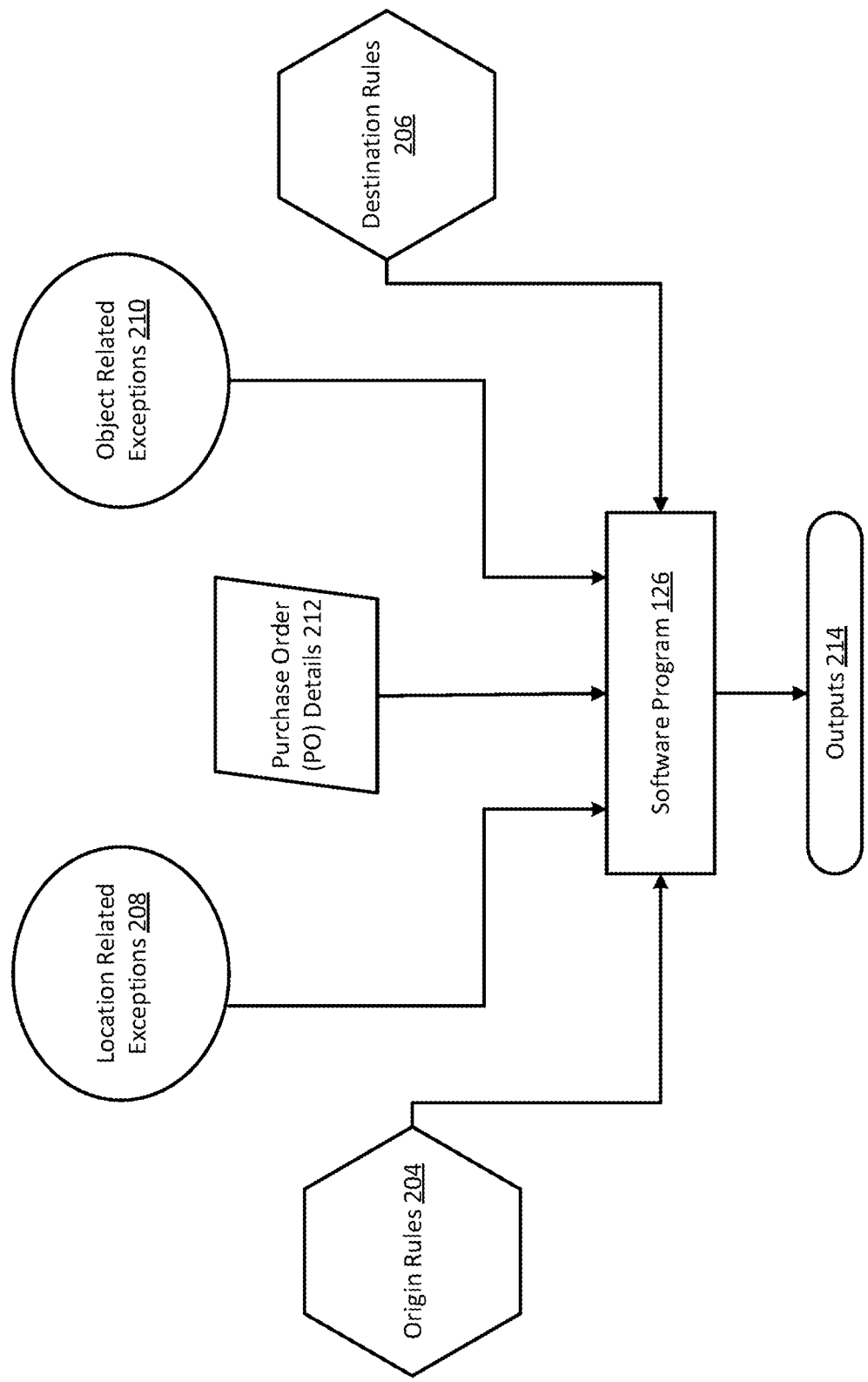
FIG. 2 is a block diagram of an example of inputs to and outputs from a software program according to some aspects of the present disclosure.

FIG. 2 is a block diagram of an example of inputs to and outputs from a software program 126 executing on one or more servers according to some aspects of the present disclosure. An example of the server(s) may be server 112 of FIG. 1. As shown, the software program 126 may receive origin rules 204 indicating if and how objects are to be combined near the origin locations of the objects (e.g., the sources of the objects). The software program 126 may additionally or alternatively receive destination rules 206 indicating if and how objects are to be combined or separated near the end destinations of the objects along a transport route. The software program 126 may additionally or alternatively receive location related exceptions 208 indicating certain source locations or destination locations that are exempt from consolidation. The software program 126 may additionally or alternatively receive object related exceptions 210 indicating certain objects that are exempt from consolidation and/or deconsolidation. The software program 126 may additionally or alternatively receive other data, such as order (PO) details 212. Some or all of this data may be provided as user input, such as by the operator 102 of FIG. 1. Some or all of this data may define the rules used to determine transport routes for objects, such as the rules 114 of FIG. 1. Based on the rules, the software program 126 may then generate any number and combination of outputs 214. Examples of the outputs 214 can include the object labels, container labels, and consolidation instructions described above based on rules.

An example of the origin rules 204 and the destination rules 206 is shown in FIG. 3. Each row indicates a route for an object. In this example, row 1 involves rules for transporting an object from a source in Egypt to an end destination that is a photo shoot in Greensboro, N.C. (GSO). The origin rule is "Direct," indicating that a direct route is to be taken from the source to the end destination. As used herein, a "direct" route can be a transport route for an object that extends from a starting location to an ending location, where the transport route does not involve an intermediary performing consolidation or deconsolidation in accordance with some aspects of the present disclosure. In this example, the object is to take a direct route from Egypt to the next destination (e.g., the end destination), without being consolidated at an intermediary that is geographically proximate to the origin. And since the destination rule is "Direct," the object is to be directly transported from Egypt to the end destination, without being consolidated or deconsolidated at an intermediary that is geographically proximate to the destination. As a result, the route only has one leg from the source to the end destination.

Row 2 involves an object being transported from a source in Egypt to an end destination designated as S000-0005, which is associated with the address 640 Madison Ave. Since the origin rule is "Direct," the object is to take a direct route from Egypt to the next destination, without being consolidated at an intermediary that is geographically proximate to the origin. In this example, the next destination is an intermediary located at 650 Madison Ave. And since the destination rule has been set to "Consol," the object will be consolidated with or deconsolidated from at least one other object at that intermediary. As a result, the route has two legs from the source to the end destination.

Row 3 involves an object being transported from a source in Hanoi to the end destination in GSO. Since the origin rule is "Consol" and the consolidation location is also in Hanoi, the object is to be transported to an intermediary in Hanoi, at which point the object will be consolidated with at least one other object for further transport to the next destination. Since the destination rule is "Direct," the object is to take a direct route from Hanoi to the end destination at GSO, without further consolidation or deconsolidation. As a result, the route has two legs from the source to the end destination.

Row 4 involves an object being transported from a source in Shanghai to an end destination designated as SA00-0002, which is associated with Compagine, DC. Since the origin rule is "Consol" and the consolidation location is also in Shanghai, the object is to be transported to an intermediary in Shanghai, at which point the object will be consolidated with at least one other object for further transport to the next destination. And since the destination rule is "Consol," the object will be transported from Shanghai to another intermediary in Italy/Compagine, at which point the object will be further consolidated or deconsolidated prior to being transported to the end destination at Compagine DC SA00-0002. As a result, the route has three legs from the source to the end destination.

Row 5 involves an object being transported from a source in Shanghai to an end destination designated as SA00-0003, which is associated with a showroom in France. This route will also have three legs for similar reasons as row 4.

It will be appreciated that the examples shown in FIG. 3 are for illustrative purposes and not intended to be limiting. Other examples may involve more, fewer, or different rules than are shown in FIG. 3. Regardless of the number, format, or arrangement of the rules, the server executing the software program can generate any number and combination of outputs based on the rules, as described above. For example, the server can generate the object labels and container labels based on the rules. Examples of such labels will now be described with respect to FIGS. 4-5.

Figure 4:
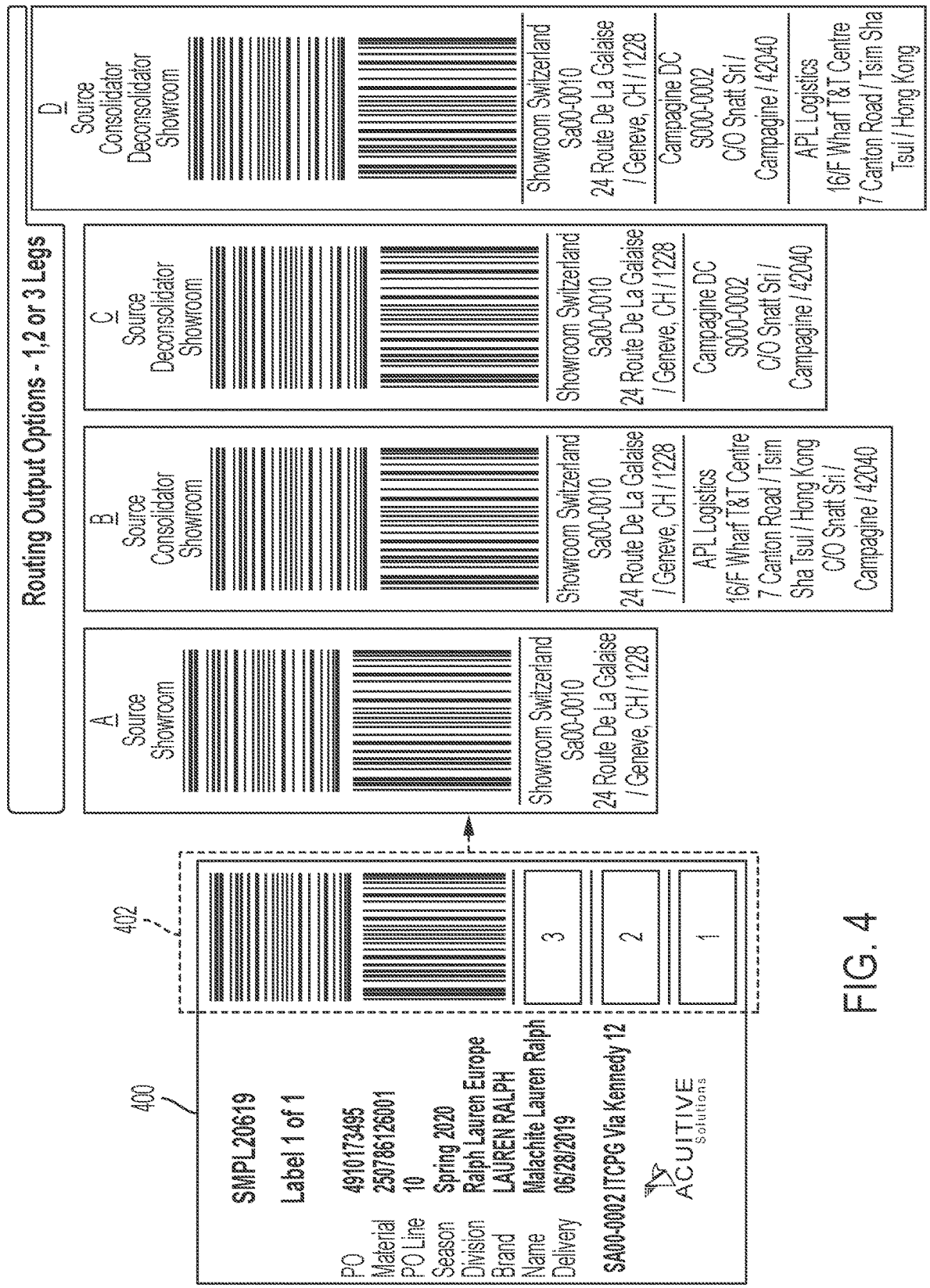
FIG. 4 is an example of an object label according to some aspects of the present disclosure.

FIG. 4 shows an example of an object label 400 that may be generated by a server according to some aspects. The left side of the object label 400 indicates various characteristics associated with the object, which in this example may be a clothing sample. The right side of the object label 400 may include one or more barcodes with encoded data, as well as multiple separate areas (e.g., designated as 1, 2, and 3 in the dashed area of FIG. 4) into which the server can incorporate transport data designating locations along a transport route. In this example, areas closer to the bottom of the object label 400 (e.g., area 1) are closer to the source of the object and areas that are closer to the top of the object label 400 (e.g., area 3) are closer to the destination of the object, but any suitable configuration of the transport data is possible.

As shown in FIG. 4, if the object is to take a direct route from the source to an end destination that is a showroom, then the dashed area of the object label 400 can be configured for a one-leg trip as shown in label A. If the object is to take an indirect route from the source to the end destination through an intermediary consolidator, then the dashed area of the object label 400 can be configured for a double leg trip as shown in label B. If the object is to take an indirect route from the source to the end destination through an intermediary de-consolidator, then the dashed area of the object label 400 can be configured for a double leg trip as shown in label C. If the object is to take an indirect route from the source to the end destination through an intermediary consolidator and an intermediary de-consolidator, then the dashed area of the object label 400 can be configured for a triple leg trip as shown in label D. Of course, these examples are intended to be non-limiting and other examples may involve more, fewer, or different configurations of transport data on an object label 400.

Figure 5:
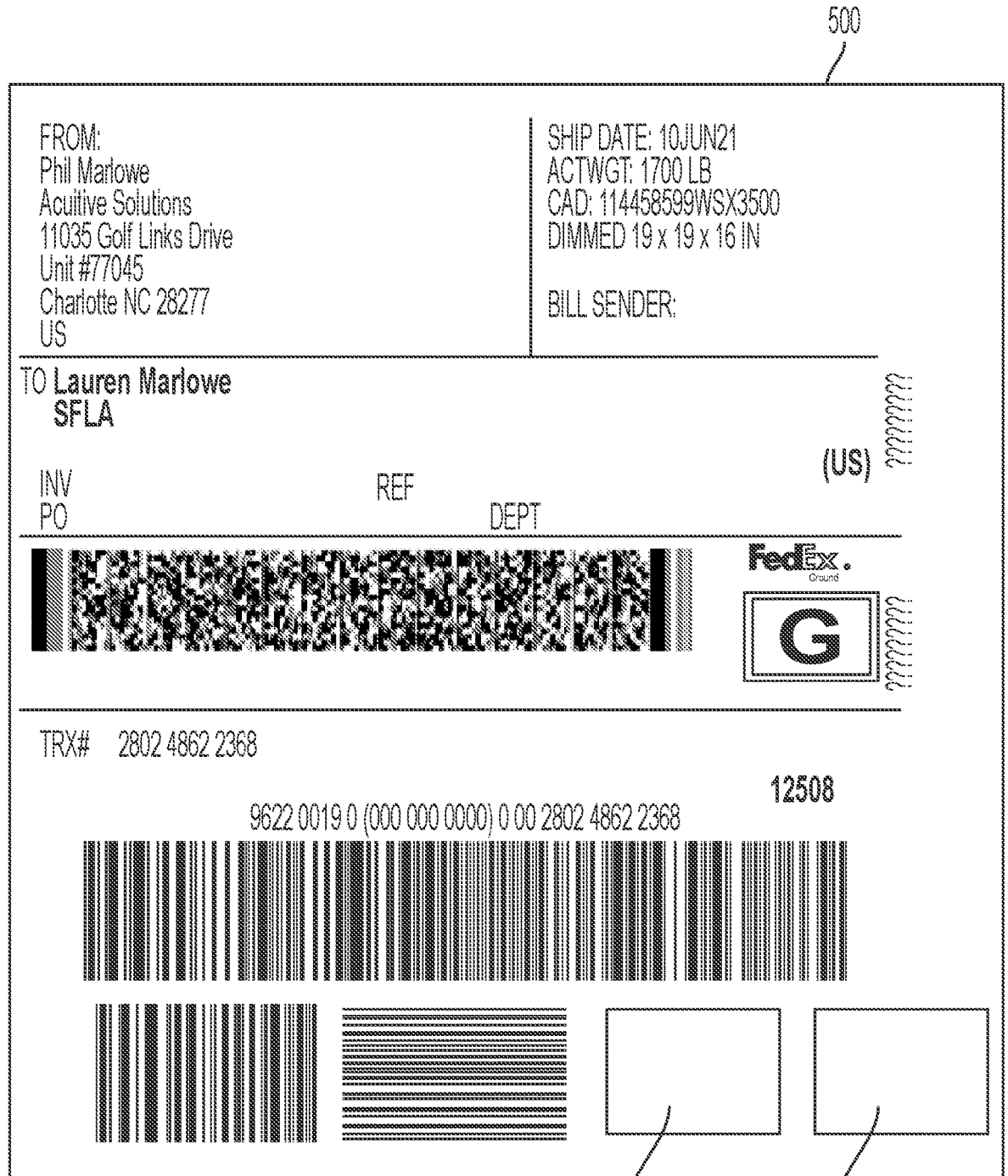
FIG. 5 is an example of a container label according to some aspects of the present disclosure.

FIG. 5 shows an example of a container label 500 that may be generated by a server according to some aspects. The container label 500 may include one or more barcodes with encoded data that can be scanned using a barcode scanner. The container label 500 may also include separate areas 502, 504 that can be configured by the server with transport data and consolidation indicators, respectively. For example, the container label 500 may be associated with a container into which multiple objects have been combined by an intermediary. Area 502 may include a unique identifier of a next destination for the container. Area 504 may include a consolidation indicator, such as the letter "C" or a numeral, indicating that multiple objects have been combined into the container. Other data may also be included on the container label 500, as shown in FIG. 5.

Figure 6:
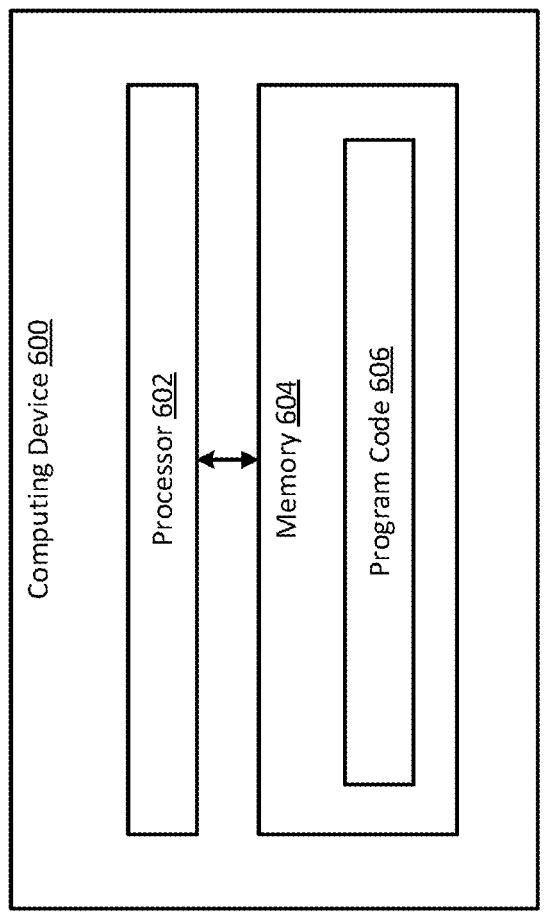
FIG. 6 is a block diagram of a computing device usable for implementing some aspects of the present disclosure.

FIG. 6 is a block diagram of an example of a computing device 600 for implementing some aspects of the present disclosure. The computing device 600 can be, for example, part of the server 112 or any of the client computers 108a-d of FIG. 1.

The computing device 600 includes a processor 602 communicatively coupled with a memory 604. The processor 602 can include one processing device or multiple processing devices. Non-limiting examples of the processor 602 include a Field-Programmable Gate Array (FPGA), an application-specific integrated circuit (ASIC), a microprocessor, etc. The processor 602 can execute program code 606 stored in the memory 604 to perform operations, such as any of the operations described herein. In some examples, the program code 606 can include processor-specific instructions generated by a compiler or an interpreter from code written in any suitable computer-programming language, such as C, C++, C#, etc.

The memory 604 can include one memory device or multiple memory devices. The memory 604 can be non-volatile and may include any type of memory device that maintains stored data when powered off. Examples of the memory 604 include electrically erasable and programmable read-only memory (EEPROM), flash memory, or any other type of non-volatile memory. At least some of the memory can include a non-transitory computer-readable medium from which the processor 602 can read program code 606. A computer-readable medium can include electronic, optical, magnetic, or other storage devices capable of providing the processor 602 with computer-readable instructions or other program code. Examples of such computer-readable mediums include magnetic disks, memory chips, ROM, random-access memory (RAM), an ASIC, a configured processor, optical storage, or any other medium from which a computer processor can read the program code 606.

The computing device 600 may also include other components, such as input/output interfaces, network interfaces, display units, busses, microphones, speakers, and so on, which have been excluded from FIG. 6 for simplicity.

Figure 7:
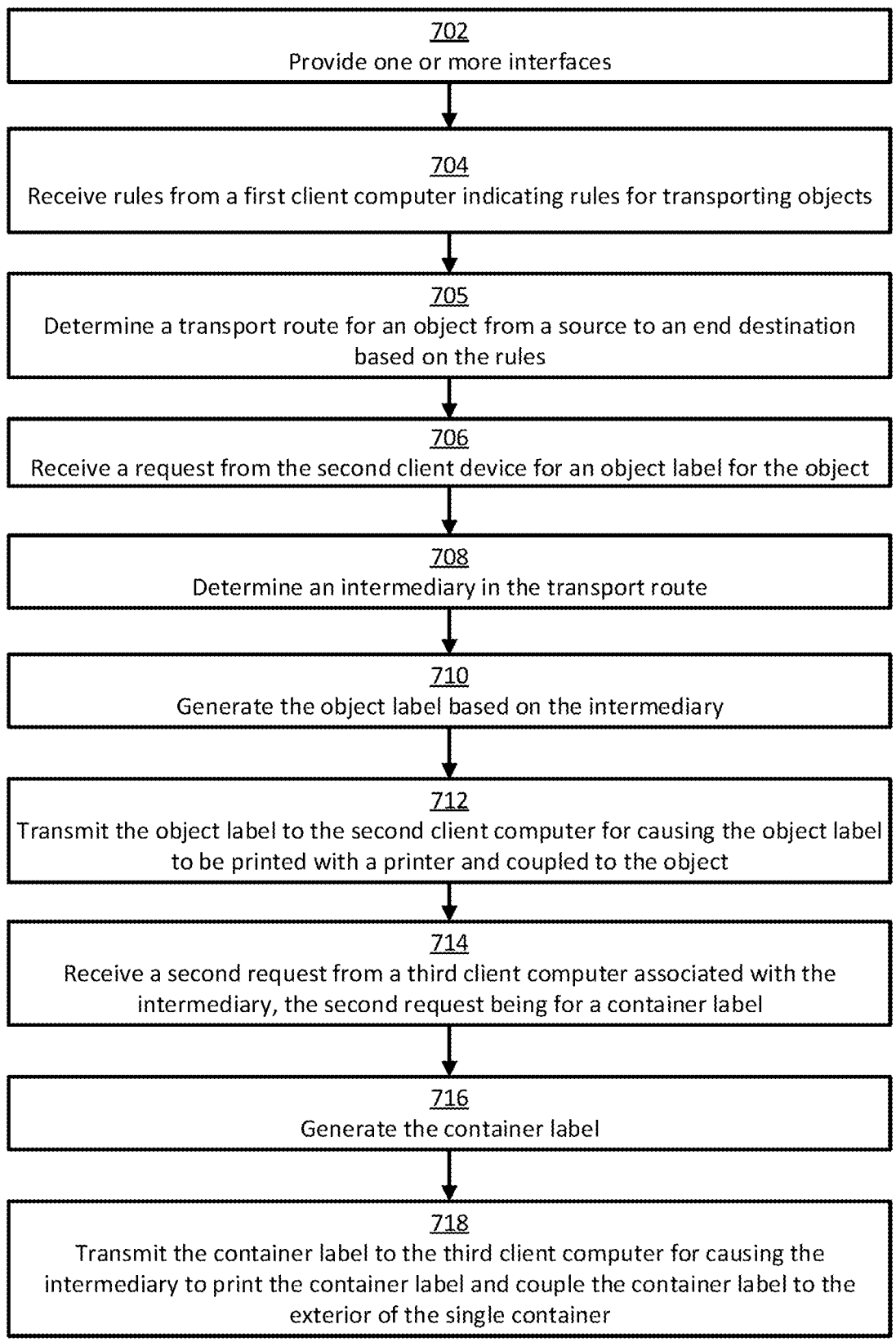
FIG. 7 is a flow chart of an example of a process capable of being implemented by a server according to some aspects of the present disclosure.

FIG. 7 is a flow chart of an example of a process capable of being implemented by a server according to some aspects of the present disclosure. Other examples can include more steps, fewer steps, different steps, or a different combination of steps than are shown in FIG. 7. The steps of FIG. 7 are discussed below with reference to the components discussed above in relation to FIGS. 1 and 6.

In block 702, a processor 602 provides one or more interfaces through which a first client computer 108d associated with an operator 102, a second client computer associated with an object source 104a, and/or a third client computer 108e associated with an intermediary 106 can interact with the processor 602 via a network 116. In some examples, the interfaces can include application programming interfaces (APIs) or user interfaces, such as graphical use interfaces. In one particular example, the interfaces can include interactive webpages of a website.

In block 704, the processor 602 receives an input 118 from the first client computer 108d associated with the operator 102. The processor 602 may receive the input 118 from the first client computer 108d via the one or more interfaces. The input 118 can include rules applicable to the transport of a plurality of individual objects 124a-c. When the input 118 is received, the plurality of individual objects may or may not already be in the process of being transported from at least one source 104a-c to at least one end destination. In some examples, the at least one end destination includes at least two end destinations that are different from one another. Based on the input 118, the processor 602 may generate and store the rules 114 in a database for subsequent use.

In block 705, the processor 602 determines a transport route for an object 124a from a source 104a to an end destinations. For example, the processor 602 can receive object data (e.g., the type, manufacturer, dimensions, and end destination of the object 124a) from a user, such as the operator 102. The processor 602 can then determine the transport route for the object 124a based on the received object data and the rules 114. For example, the processor 602 can apply some or all of the rules 114 to the object data to determine the transport route for the object 124a. The processor 602 can then store the transport route in memory for subsequent use.

In block 706, the processor 602 receives a request 120 from the second client computer 108a associated with an object source 104a, where the request 120 is for an object label corresponding to the object 124a. The processor 602 may receive the request 120 from the second client computer 108a via the one or more interfaces.

In block 708, the processor 602 determines an intermediary 106 in the transport route. For example, the processor 602 can determine that the object 124a is to be consolidated at the intermediary 106 based on transport route determined based on the rules 114.

In block 710, the processor 602 generates the object label based on the intermediary 106. For example, the object label can include (i) a barcode encoded with data about the object 124a and (ii) a unique identifier of the intermediary 106. The barcode can be configured to be scanned using a barcode scanner 128 by the intermediary 106 for monitoring the object 124a as it is transported from the source 104a to the end destination.

In block 712, the processor 602 transmits the object label to the second client computer 108a for causing the object source 104a to print the object label using a printer 110a and couple the object label to the object 124a. The processor 602 may transmit the object label to the second client computer 108a via the one or more interfaces. After the object label has been coupled to the object 124a, the object source can submit the object 124a to a carrier for transport to the intermediary 106.

In block 714, the processor 602 receives a second request 122 from a third client computer 108e associated with the intermediary 106, where the second request 122 is for a container label configured to be printed and coupled to an exterior of the single container. The processor 602 may receive the second request 122 via the one or more interfaces.

In block 716, the processor 602 generates the container label in response to receiving the second request 122. The container label can designate a next destination along the transport route. The next destination may be, for example, another intermediary or the final destination. In some examples, the processor 602 can generate the container label based on the one or more rules 114 and/or the previously determined transport route for the object. For example, if the determined transport route for the object is a three-leg trip (e.g., similar to row five of FIG. 3), then the processor 602 can determine that the next destination is another intermediary in the transport route and generate a container label that designates the next intermediary as the next destination.

In block 718, the processor 602 transmits the container label to the third client computer 108e for causing the intermediary 106 to print (e.g., via printer 110d) the container label and couple the container label to the exterior of the single container. The processor 602 may transmit the container label to the third client computer 108e via the one or more interfaces.

Figure 8:
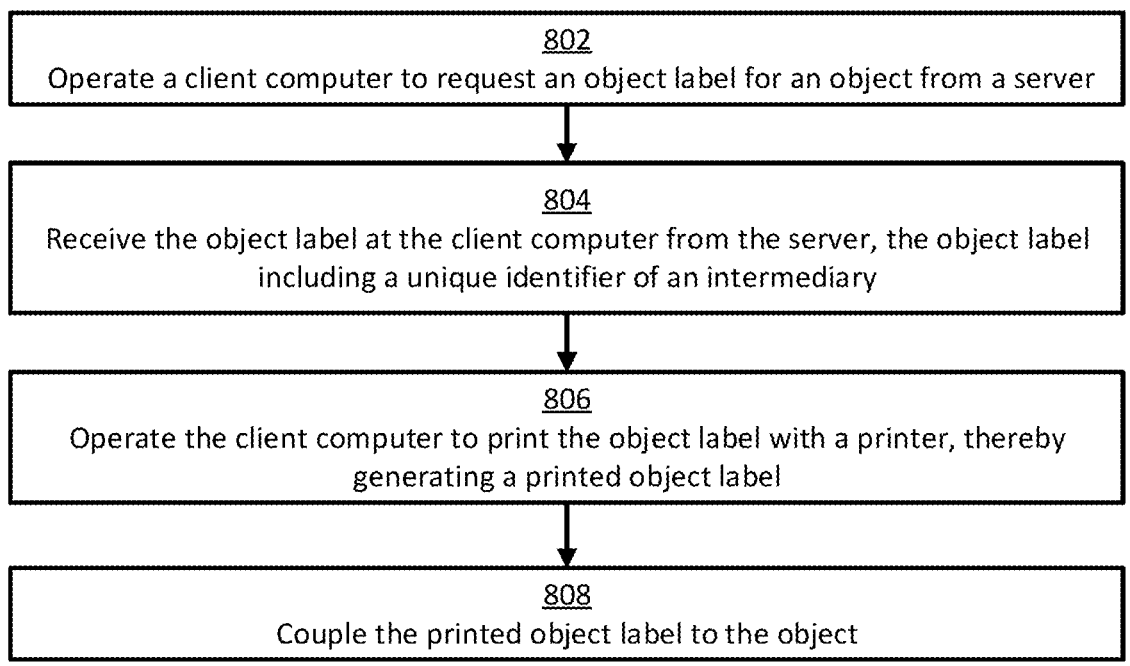
FIG. 8 is a flow chart of an example of a process capable of being implemented by an object source according to some aspects of the present disclosure.

FIG. 8 is a flow chart of another example of a process capable of being implemented by an object source according to some aspects of the present disclosure. Other examples can include more steps, fewer steps, different steps, or a different combination of steps than are shown in FIG. 8. The steps of FIG. 8 are discussed below with reference to the components discussed above in relation to FIG. 1.

In block 802, an object source 104 operates a client computer 108a to request an object label for an object 124a from a server 112, where the object 124a is to be transported from the source 104 to an end destination.

In block 804, the source 104 receives the object label at the client computer 108a from the server 112. The object label can include a unique identifier of an intermediary 106 at which the object 124a is to be combined with at least one other object into a single container.

In block 806, the source 104 operates the client computer 108a to print the object label with a printer 110, thereby generating a printed object label.

In block 808, the source 104 couples the printed object label to the object 124a. Coupling the printed object label to the object 124a can involve physically affixing the object label to the object itself or to a container for the object, for example by using an adhesive (e.g., glue or tape), a mechanical fastener (e.g., a staple), or any other suitable means.

In block 810, the source 104 deposits the object 124a (with the attached object label) with a carrier for transport to the intermediary 106. For example, the source 104 can drop the object 124a off at a mail box for pickup by the carrier.

Figure 9:
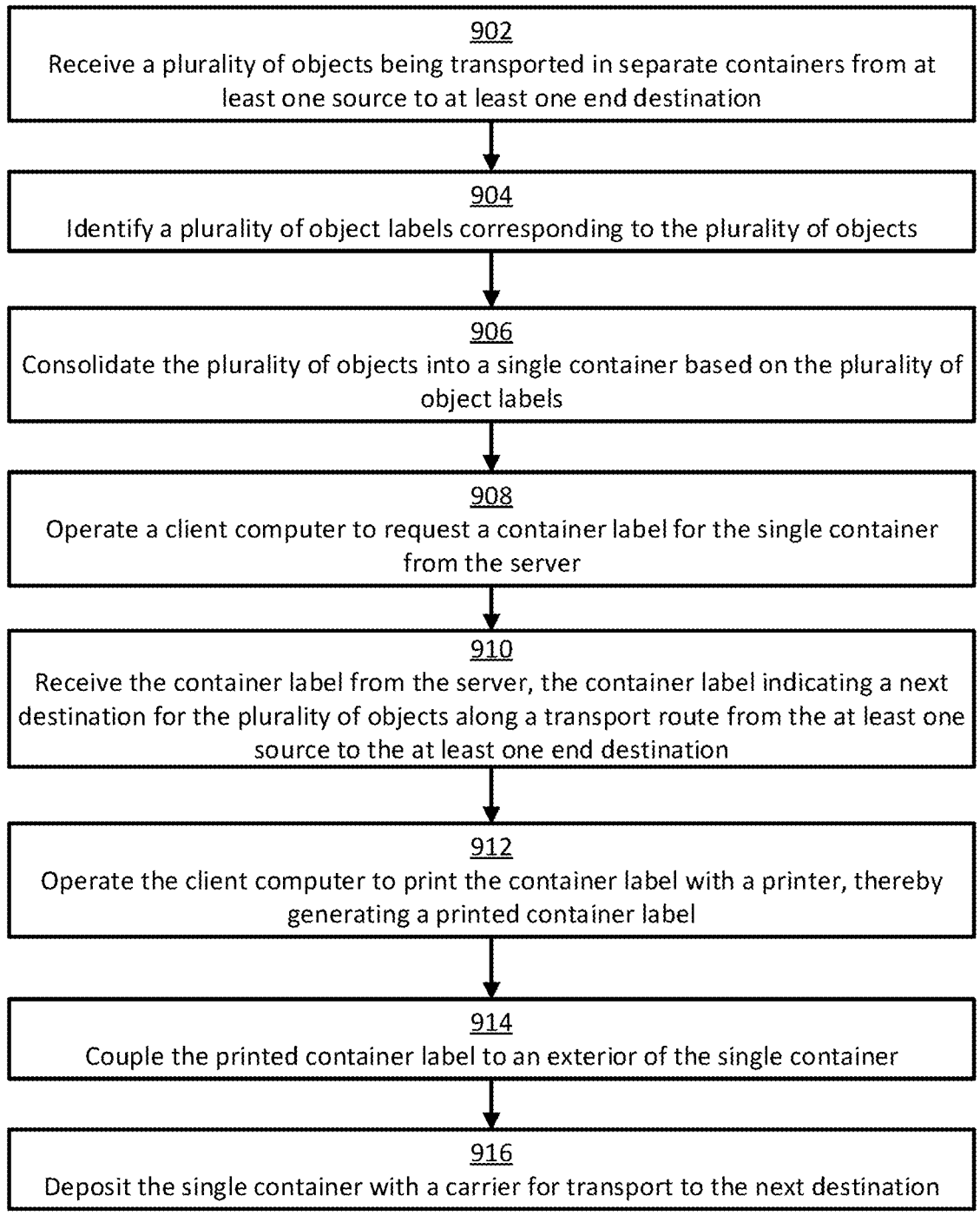
FIG. 9 is a flow chart of an example of a process capable of being implemented by an intermediary according to some aspects of the present disclosure.

FIG. 9 is a flow chart of another example of a process capable of being implemented by an intermediary according to some aspects of the present disclosure. Other examples can include more steps, fewer steps, different steps, or a different combination of steps than are shown in FIG. 9. The steps of FIG. 9 are discussed below with reference to the components discussed above in relation to FIG. 1.

In block 902, an intermediary 106 receives a plurality of objects 124a-c being transported in separate containers from at least one source 104a-c to at least one end destination.

In block 904, the intermediary 106 identifies a plurality of object labels corresponding to the plurality of objects 124a-c.

In block 906, the intermediary 106 combines the plurality of objects 124a-c into a single container based on the plurality of object labels. For example, the intermediary 106 can determine that the next destination for the plurality of objects 124a-c is the same by analyzing their respective object labels. As a result, the intermediary 106 can package the plurality of objects 124a-c together into the single container for their collective delivery to the next destination.

In some examples, the intermediary 106 can combine the plurality of objects 124a-c into the container based on a consolidation instruction from a server 112. For example, the intermediary 106 can operate a client computer 108e to request the consolidation instruction from the server 112. The client computer 108e can include information about the objects 124a-c in the request, where such information may be obtained from the object labels coupled to the plurality of objects 124a-c (e.g., by scanning the barcodes on the object labels with a barcode scanner 128). Examples of such information can include the objects' names, types, dimensions, barcode numbers, unique identifiers, sources, end destinations, or any combination of these. The server 112 can receive the request and generate the consolidation instruction based on the information. The server 112 can then provide the consolidation instruction to the client computer 108e, at which point the intermediary 106 can combine the plurality of objects 124a-c into a single container based on the consolidation instruction.

In block 908, the intermediary 106 operates the client computer 108e to request 122 a container label for the single container from the server 112.

In block 910, the intermediary 106 receives the container label at the client computer 108e from the server 112. The container label can indicate a next destination for the plurality of objects 124a-c along a transport route from the at least one source 104a-c to the at least one end destination.

In block 912, the intermediary 106 operates the client computer 108e to print the container label with a printer 110d, thereby generating a printed container label.

In block 914, the intermediary 106 couples the printed container label to an exterior of the single container.

In block 916, the intermediary 106 deposits the single container with a carrier for transport to the next destination.

Figure 10:
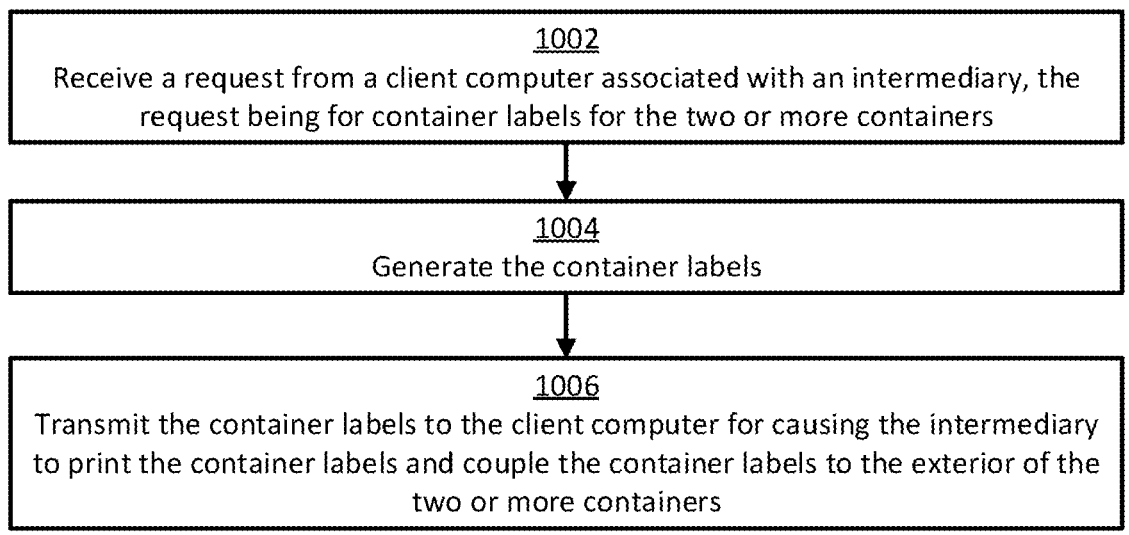
FIG. 10 is a flow chart of another example of a process capable of being implemented by a server according to some aspects of the present disclosure.

FIG. 10 is a flow chart of another example of a process capable of being implemented by a server according to some aspects of the present disclosure. The following process can generally relate to deconsolidating two or more objects from a single container into two or more separate containers. Other examples can include more steps, fewer steps, different steps, or a different combination of steps than are shown in FIG. 10. The steps of FIG. 10 are discussed below with reference to the components discussed above in relation to FIG. 1.

In block 1002, the processor 602 receives a request 122 from a client computer 108e associated with an intermediary 106 at which two or more objects 124a-c are to be deconsolidated. The request 122 can be for container labels configured to be printed and coupled to an exterior of the two or more containers that are to carry the two or more objects 124a-c. The processor 602 may receive the request 122 via the one or more interfaces.

In block 1004, the processor 602 generates the container labels in response to receiving the request 122. The container labels can designate a next destination for each respective object along its respective transport route. The next destination may be, for example, another intermediary or the final destination. In some examples, the processor 602 can generate the container labels based on the rules 114 and/or the transport routes previously determined for the respective objects. For example, if the transport routes for the objects 124a-c are each a three-leg trip (e.g., similar to row five of FIG. 3), then the processor 602 can determine that the next destination for each object is another intermediary and generate a container label that designates the next intermediary as the next destination.

In block 1006, the processor 602 transmits the container labels to the client computer 108e for causing the intermediary 106 to print (e.g., via printer 110d) the container labels and couple the container labels to the exteriors of the two or more containers. The processor 602 may transmit the container labels to the client computer 108e via the one or more interfaces.

Figure 11:
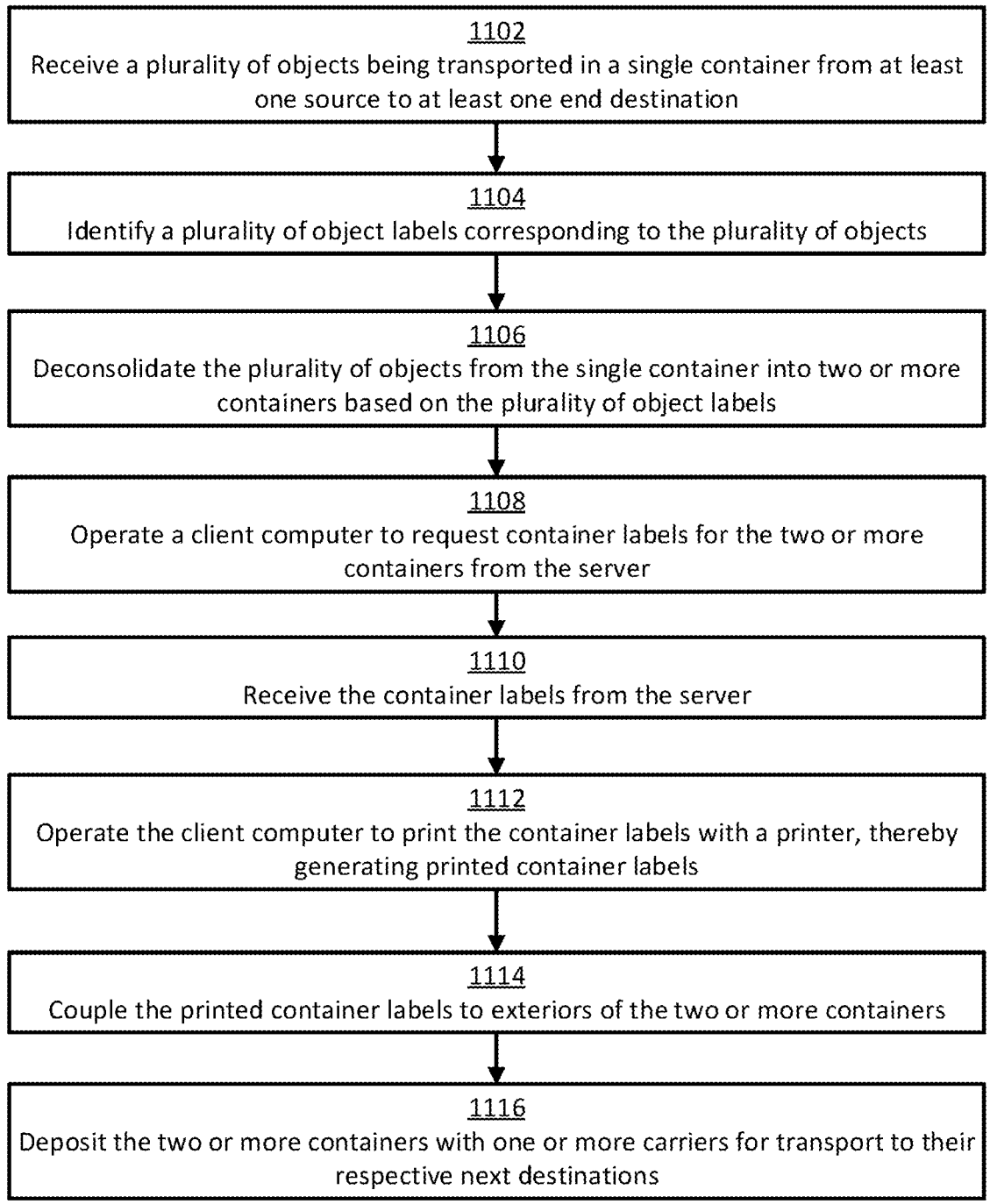
FIG. 11 is a flow chart of another example of a process capable of being implemented by an intermediary according to some aspects of the present disclosure.

FIG. 11 is a flow chart of another example of a process capable of being implemented by an intermediary according to some aspects of the present disclosure. The following process can generally relate to deconsolidating two or more objects from a single container into two or more separate containers. Other examples can include more steps, fewer steps, different steps, or a different combination of steps than are shown in FIG. 11. The steps of FIG. 11 are discussed below with reference to the components discussed above in relation to FIG. 1.

In block 1102, an intermediary 106 receives a plurality of objects 124a-c being transported in a single container from at least one source 104a-c to at least one end destination.

In block 1104, the intermediary 106 identifies a plurality of object labels corresponding to the plurality of objects 124a-c. For example, the intermediary 106 can open the single container and obtain the object label coupled to each individual object of the plurality of objects 124a-c.

In block 1106, the intermediary 106 deconsolidates the plurality of objects 124a-c from the single container into two or more containers based on the plurality of object labels.

For example, the intermediary 106 can determine that the next destinations for the plurality of objects 124a-c are different to one another by analyzing their respective object labels. As a result, the intermediary 106 can package the plurality of objects 124a-c into separate containers for delivery to their next destinations.

In some examples, the intermediary 106 can deconsolidate the plurality of objects 124a-c from the single container into two or more containers based on a deconsolidation instruction from a server 112. For example, the intermediary 106 can operate a client computer 108e to request the an instruction from the server 112. The client computer 108e can include information about the objects 124a-c in the request, where such information may be obtained from the object labels coupled to the plurality of objects 124a-c (e.g., by scanning the barcodes on the object labels with a barcode scanner 128). Examples of such information can include the objects' names, types, dimensions, barcode numbers, unique identifiers, sources, end destinations, or any combination of these. The server 112 can receive the request and generate the deconsolidation instruction based on the information. The server 112 can then provide the deconsolidation instruction to the client computer 108e, at which point the intermediary 106 can remove the plurality of objects 124a-c from the single container and separate them into different containers based on the deconsolidation instruction.

In block 1108, the intermediary 106 operates the client computer 108e to request 122 container labels for the two or more containers from the server 112.

In block 1110, the intermediary 106 receives the container labels at the client computer 108e from the server 112. The container labels can indicate a next destination for each object of the plurality of objects 124a-c along their respective transport routes.

In block 1112, the intermediary 106 operates the client computer 108e to print the container labels with a printer 110d, thereby generating a printed container labels.

In block 1114, the intermediary 106 couples the printed container labels to exteriors of the two or more containers.

In block 1116, the intermediary 106 deposits the two or more containers with one or more carriers for transport to their respective next destinations.

Figure 12:
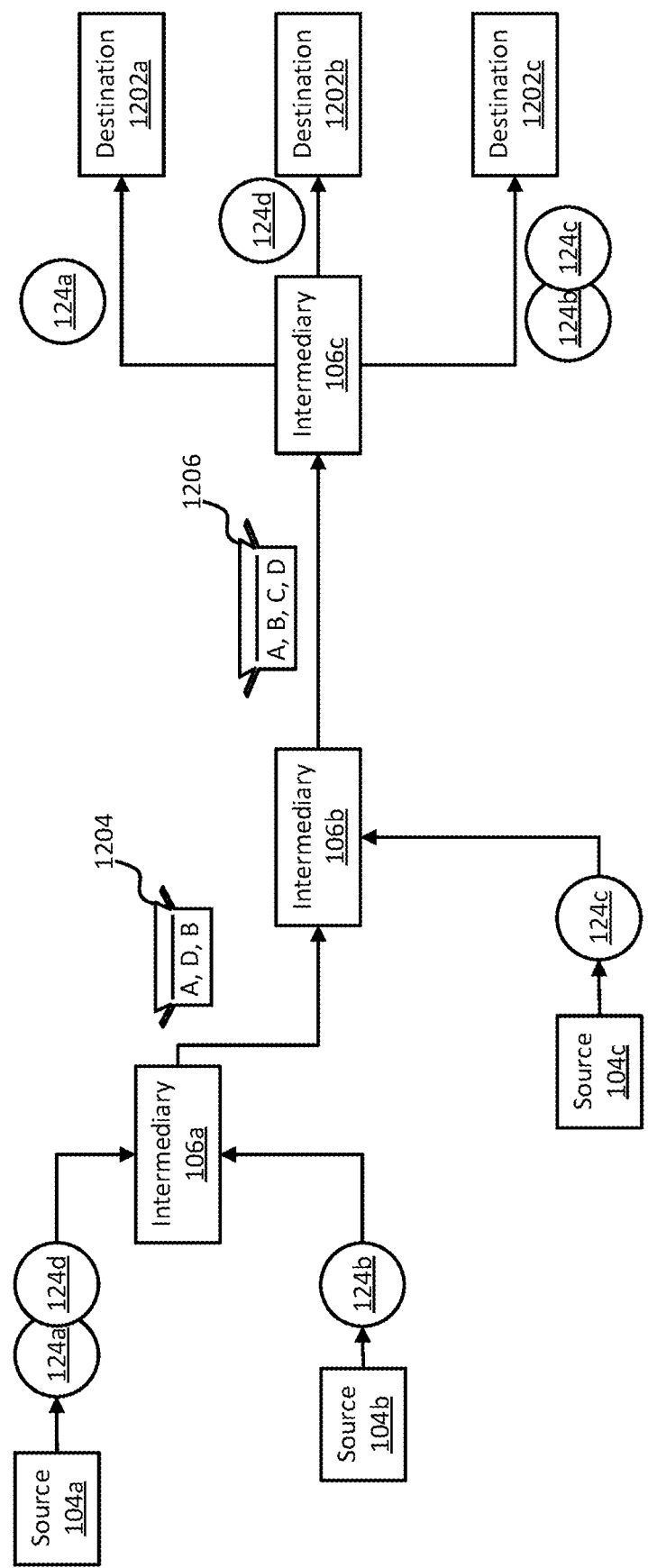
FIG. 12 is an example of consolidations and de-consolidations of objects along transport routes according to some aspects of the present disclosure.

FIG. 12 is an example of consolidations and de-consolidations of objects along transport routes according to some aspects of the present disclosure. In this example, the source 104a can manufacture objects 124a, 124d and send them to an intermediary 106a. The source 104a can send the objects 124a, 124d to the intermediary 106a separately in individual containers or together in a single container. Similarly, source 104b can manufacture object 124b and send it to the intermediary 106a. The intermediary 106a can combine objects 124a, 124b, and 124d into a single container 1204 based on their object labels. The intermediary 106a can also obtain a container label from the server and apply it to the single container 1204 as described above. The intermediary 106a can then send the container 1204 with objects 124a, 124b, and 124d to another intermediary 106b.

Intermediary 106b can receive the container 1204 as well as another object 124c from another source 104c. The intermediary 106b can combine the objects 124a-d into a single container 1206 based on their object labels. The intermediary 106b can also obtain a container label from the server and apply it to the single container 1206 as described above. The intermediary 106b can then send the container 1206 with objects 124a-d to another intermediary 106c.

Intermediary 106c can receive the container 1206 and separate the objects 124a-d from the single container 1206 based on their object labels. The intermediary 106c can then send the objects 124a-d to their respective destinations 1202a-c. For example, the intermediary 106c can pack the individual objects 124a-d into separate containers, obtain container labels from the server, apply the container labels to the containers, and submit the containers to one or more carriers for transport to their respective destinations 1202a-c.

While the example of FIG. 12 shows two consolidation stages followed by a single deconsolidation stage, this is intended to be illustrative and non-limiting. Other examples may involve more, fewer, or a different order of consolidation stages and deconsolidation stages than is shown in FIG. 12. For instance, another example may involve two deconsolidation stages.

The above description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A method comprising:
providing, by a processor, a website to a client computer via a network;
determining, by the processor, a plurality of transport routes for a plurality of individual objects based on rules stored in a memory device, the plurality of transport routes including first intermediary at which the plurality of individual objects are to be consolidated into a single container, and wherein the plurality of transport routes include a second intermediary at which the plurality of individual objects are to be deconsolidated from the single container back into individual containers for further transport to at least one end destination;
receiving, by the processor, a request from the client computer via the website for a label corresponding to an object among the plurality of individual objects; and
in response to receiving the request:
generating, by the processor, a digital label that includes a first unique identifier of the first intermediary and a second unique identifier of the second intermediary; and
transmitting, by the processor, the digital label to the client computer via the website for causing the digital label to be printed with a printer as a physical label and coupled to the object.

2. The method of claim 1, further comprising, prior to determining the plurality of transport routes:
receiving the rules from another client computer; and
storing the rules in the memory device.

3. The method of claim 1, further comprising:
determining the first intermediary based on a transport route for the object, the transport route being selected from among the plurality of transport routes; and
generating the digital label based on the first intermediary.

4. The method of claim 1, further comprising:
receiving, by the processor, another request from another client computer associated with the first intermediary, the other request being for a container label configured to be printed and coupled to an exterior of the single container;

generating, by the processor, the container label in response to receiving the other request; and transmitting, by the processor, the container label to the other client computer for causing the first intermediary to print the container label and couple the container label to the exterior of the single container.

5. The method of claim 1, further comprising:

determining, by the processor, a consolidation instruction for consolidating the plurality of individual objects into the single container; and transmitting, by the processor, the consolidation instruction to the first intermediary for causing the first intermediary to consolidate the plurality of individual objects into the single container.

6. The method of claim 1, wherein the plurality of individual objects are to be transported to a plurality of end destinations that are different from one another.

7. A system comprising:

a processor; and a memory including program code that is executable by the processor for causing the processor to perform operations including:

providing a website to a client computer via a network;

determining a plurality of transport routes for a plurality of individual objects based on rules stored in a memory device, the plurality of transport routes including first intermediary at which the plurality of individual objects are to be consolidated into a single container, and wherein the plurality of transport routes include a second intermediary at which the plurality of individual objects are to be deconsolidated from the single container back into individual containers for further transport to at least one end destination;

receiving a request from the client computer via the website for a label corresponding to an object among the plurality of individual objects; and in response to receiving the request:

generating a digital label that includes a first unique identifier of the first intermediary and a second unique identifier of the second intermediary; and transmitting the digital label to the client computer via the website for causing the digital label to be printed with a printer as a physical label and coupled to the object.

8. The system of claim 7, wherein the operations further include, prior to determining the plurality of transport routes:

receiving the rules from another client computer; and storing the rules in the memory device.

9. The system of claim 7, wherein the operations further include:

determining the first intermediary based on a transport route for the object, the transport route being selected from among the plurality of transport routes; and generating the digital label based on the first intermediary.

10. The system of claim 7, wherein the operations further include:

receiving another request from another client computer associated with the first intermediary, the other request being for a container label configured to be printed and coupled to an exterior of the single container;

generating the container label in response to receiving the other request; and transmitting the container label to the other client computer for causing the first intermediary to print the container label and couple the container label to the exterior of the single container.

11. The system of claim 7, wherein the operations further include:

determining a consolidation instruction for consolidating the plurality of individual objects into the single container; and transmitting the consolidation instruction to the first intermediary for causing the first intermediary to consolidate the plurality of individual objects into the single container.

12. The system of claim 7, wherein the plurality of individual objects are to be transported to a plurality of end destinations that are different from one another.

13. A non-transitory computer-readable medium comprising program code that is executable by a processor for causing the processor to perform operations including:

determining a plurality of transport routes for a plurality of individual objects based on rules stored in a memory device, the plurality of transport routes including an intermediary at which the plurality of individual objects are to be consolidated into a single container;

receiving a request from a client computer via an interface for a label corresponding to an object among the plurality of individual objects;

in response to receiving the request:

generating a digital label that includes a unique identifier of the intermediary; and transmitting the digital label to the client computer via the interface for causing the digital label to be printed with a printer as a physical label and coupled to the object;

receiving another request from another client computer associated with the intermediary, the other request being for a container label configured to be printed and coupled to an exterior of the single container;

generating the container label in response to receiving the other request; and transmitting the container label to the other client computer for causing the intermediary to print the container label and couple the container label to the exterior of the single container.

14. The non-transitory computer-readable medium of claim 13, wherein the operations further include, prior to determining the plurality of transport routes:

receiving the rules from another client computer; and storing the rules in the memory device.

15. The non-transitory computer-readable medium of claim 13, wherein the operations further include:

determining the intermediary based on a transport route for the object, the transport route being selected from among the plurality of transport routes; and generating the digital label based on the intermediary.

16. The non-transitory computer-readable medium of claim 13, wherein the intermediary is a first intermediary, the unique identifier is a first unique identifier, the plurality of transport routes include a second intermediary at which the plurality of individual objects are to be deconsolidated from the single container back into individual containers for further transport to at least one end destination, and wherein the operations further include generating the digital label to include a second unique identifier of the second intermediary.

17. The non-transitory computer-readable medium of claim 13, wherein the operations further include:

determining a consolidation instruction for consolidating the plurality of individual objects into the single container; and transmitting the consolidation instruction to the intermediary for causing the intermediary to consolidate the plurality of individual objects into the single container.

18. A method comprising:

determining, by one or more processors, a plurality of transport routes for a plurality of individual objects based on rules stored in a memory device, the plurality of transport routes including an intermediary at which the plurality of individual objects are to be consolidated into a single container;

receiving, by the one or more processors, a request from a client computer via an interface for a label corresponding to an object among the plurality of individual objects;

in response to receiving the request:
generating, by the one or more processors, a digital label that includes a unique identifier of the intermediary; and
transmitting, by the one or more processors, the digital label to the client computer via the interface for causing the digital label to be printed with a printer as a physical label and coupled to the object;

receiving, by the one or more processors, another request from another client computer associated with the intermediary, the other request being for a container label configured to be printed and coupled to an exterior of the single container;

generating, by the one or more processors, the container label in response to receiving the other request; and transmitting, by the one or more processors, the container label to the other client computer for causing the intermediary to print the container label and couple the container label to the exterior of the single container.

19. The method of claim 18, further comprising, prior to determining the plurality of transport routes:

receiving the rules from another client computer; and storing the rules in the memory device.

20. The method of claim 18, further comprising:

determining the intermediary based on a transport route for the object, the transport route being selected from among the plurality of transport routes; and generating the digital label based on the intermediary.

21. The method of claim 18, wherein the intermediary is a first intermediary, the unique identifier is a first unique identifier, the plurality of transport routes include a second intermediary at which the plurality of individual objects are to be deconsolidated from the single container back into individual containers for further transport to at least one end destination, and further comprising generating the digital label to include a second unique identifier of the second intermediary.

22. The method of claim 18, further comprising:

determining a consolidation instruction for consolidating the plurality of individual objects into the single container; and transmitting the consolidation instruction to the intermediary for causing the intermediary to consolidate the plurality of individual objects into the single container.

* * * * *